United States Patent
Solaroli

(12) 
(10) Patent No.: US 6,282,898 B1
(45) Date of Patent: Sep. 4, 2001

(54) OPERATION OF FORCED INDUCTION INTERNAL COMBUSTION ENGINES

(76) Inventor: Alberto Solaroli, 40 Melford Drive, Unit #1, Scarborough (CA), M1B 2G2

( * ) Notice: Subject to any disclaimer, the term of this patent is extended or adjusted under 35 U.S.C. 154(b) by 0 days.

(21) Appl. No.: 09/310,992

(22) Filed: May 13, 1999

(51) Int. Cl.$^7$ .................................................... F02B 33/44
(52) U.S. Cl. ........................... 60/605.1; 60/606; 60/620; 123/556; 277/235 R; 277/235 A
(58) Field of Search .................................. 60/605.1, 606, 60/620; 123/556, 90.51; 277/235 R, 235 A; 204/26; 428/682

(56) References Cited

U.S. PATENT DOCUMENTS

| | | |
|---|---|---|
| 3,568,650 | 3/1971 | Albrich . |
| 3,697,091 * | 10/1972 | Prasse et al. ...................... 277/235 A |
| 3,731,941 * | 5/1973 | Mori et al. ......................... 277/235 R |
| 3,794,334 * | 2/1974 | Prasse et al. ...................... 277/235 A |
| 3,932,228 * | 1/1976 | Sugiyama et al. ...................... 204/26 |
| 4,125,999 * | 11/1978 | Melchior ................................. 60/606 |
| 4,248,198 | 2/1981 | Deutschmann et al. . |
| 4,251,599 * | 2/1981 | McCormick .......................... 428/682 |
| 4,284,055 * | 8/1981 | Wakeman .............................. 123/556 |
| 4,400,944 | 8/1983 | Iwamoto et al. .................... 60/605.1 |
| 4,417,560 | 11/1983 | Frank . |
| 4,445,336 | 5/1984 | Inoue ................................... 60/605.1 |
| 4,489,560 | 12/1984 | Fawcett et al. . |
| 4,598,675 * | 7/1986 | Long ................................... 123/90.51 |
| 4,663,938 * | 5/1987 | Colgate ................................. 60/620 |
| 4,664,021 * | 5/1987 | Ruddy ...................................... 92/223 |
| 4,840,164 | 6/1989 | Parsons . |
| 4,916,903 * | 4/1990 | Holmer ............................... 60/605.1 |
| 5,125,235 | 6/1992 | Yanagihara et al. ................ 60/605.1 |
| 5,375,581 | 12/1994 | Muller-Alander et al. . |
| 5,402,765 | 4/1995 | Spinnler ............................. 123/559.1 |
| 5,429,100 | 7/1995 | Goto et al. . |
| 5,950,432 * | 9/1999 | Zimmer et al. ..................... 60/605.1 |

FOREIGN PATENT DOCUMENTS

| | | | |
|---|---|---|---|
| 0 197 654 A2 | 10/1986 | (EP) | ..................................... 277/944 |
| 0 609 837 A1 | 8/1994 | (EP) . | |
| 03260089 * | 11/1991 | (JP) . | |

* cited by examiner

*Primary Examiner*—Thomas Denion
*Assistant Examiner*—Thai-Ba Trieu
(74) *Attorney, Agent, or Firm*—Ridout & Maybee LLP

(57) ABSTRACT

A spark ignition internal combustion engine having at least one combustion chamber and an operating cycle with induction, compression, power and exhaust phases, said engine having a forced induction system including an intake air compressor supplying intake air to the engine through an inlet tract comprising at least one throttle, at least one intake port and means to introduce metered quantities of fuel into the inlet tract; wherein the compressor is designed to boost intake air pressure by more than one atmosphere throughout that portion of the operating range of the engine which corresponds to significant opening of the at least one throttle, the at least one throttle and at least one intake port conjointly providing sufficient throttling of the intake air flow over said portion of the operating range such as to provide substantially adiabatic expansion of the air delivered by the compressor through the inlet tract, while causing each combustion chamber to be charged with sufficient air/fuel mixture during the induction phase that the pressure in each combustion chamber at the end of the compression phase is at least ten atmospheres over said portion of the operating range and the combined temperature and pressure conditions in the combustion chamber during the compression phase remain outside those giving rise to pre-ignition, the means to introduce metered quantities of fuel into the inlet tract being calibrated to provide substantially stoichiometric quantities of fuel relative to the air passing through the tract over said portion of the operating range.

5 Claims, 1 Drawing Sheet

OPERATION OF FORCED INDUCTION INTERNAL COMBUSTION ENGINES

FIELD OF THE INVENTION

Figure 2:
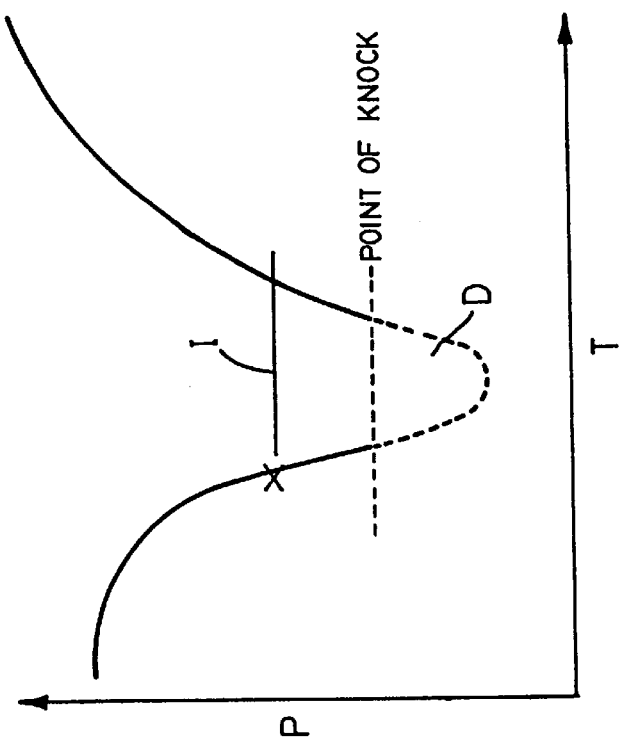

This invention relates to the operation of forced induction (for example supercharged or turbocharged) internal combustion engines of the spark ignition type.

BACKGROUND OF THE INVENTION

It has long been known that the specific power output of internal combustion engines can be increased by supplying pressurized air to the engine inlet port such that a larger charge of air can be inducted into the combustion chamber or chambers of the engine during each cycle. In a spark ignition engine it is a fuel/air mixture that is induced, whereas in a compression ignition engine it is air that is induced, with fuel being injected directly into the compressed charge.

The application of forced induction to spark ignition engine presents various problems, one of which is that of pre-ignition of the air/fuel charge prior to the normal ignition timing. Such pre-ignition (or knocking) degrades engine performance and applies damaging shock forces to the engine; it must be avoided during normal engine operation. The necessity to avoid pre-ignition limits the compression ratio that can be utilized in spark ignition engines, it may require the use of high octane fuels which delay the inception of pre-ignition, and it has limited the circumstances under which forced induction can be used effectively, as well as necessitating the use of intercoolers to cool the compressed air before it is applied to the engine. In typical applications, this has entailed that forced induction can be applied effectively only under essentially full throttle conditions at high engine speeds. Under such conditions it is undoubtedly effective in increasing specific power output, but in most automotive applications, high speed full throttle operation occurs for only a very small proportion of the total operating time of the engine. It has been necessary to avoid conditions under which excessive temperatures and pressures occur with the combustion chamber(s) of the engine during the compression stroke since these tend to result in pre-ignition. One approach to this problem has involved so-called lean-burn technology, as disclosed for example in U.S. Pat. No. 5,135,235 (Yanagihara). In such an engine system, the boost applied by the forced induction system is also related to the air/fuel ratio of the mixture applied to the engine, with this ratio increasing with increasing boost of the intake air. This tends to reduce the tendency to pre-ignition, while the increased volume of air passed through the system assists somewhat in reducing engine temperatures, and somewhat extends the range over which some boost can be effectively applied.

SUMMARY OF THE INVENTION

It is an object of the present invention to provide a forced induction internal combustion engine in which a substantial increase in operating efficiency can be achieved over much of the engine operating range, while avoiding pre-ignition.

My invention is based on the discovery that, provided that combustion chamber pressure is kept high enough and temperature is kept low enough during the pre-ignition period (that period at the end of the induction stroke during which pre-ignition typically occurs), pre-ignition can be avoided. This can permit a large increase in volumetric efficiency of the engine under part throttle conditions which is accompanied by a notable increase in overall efficiency. This greatly increases efficiency in converting the thermal energy of the fuel into mechanical energy, and conversely correspondingly reduces the waste heat generated by the engine. Because the blower or other compressor used to boost the engine is effective whenever the engine is producing significant power, it is more effective, assuming that an exhaust driven turbocharger is used, in recovering energy from the exhaust gases, and the high effective pressures in the engine mean that any exhaust back-pressure from the turbine of the turbocharger should not be a significant problem.

Under conditions, other than idle or closed throttle, when the engine is required to develop significant power, sufficient pressure boost is applied to the intake air to ensure that firstly a sufficient pressure drop occurs across the combination of a throttle valve or valves and an intake valve or valves downstream of an air compressor to provide substantial cooling of the air, and secondly to ensure that, even after this pressure drop, an effective compression ratio of at least 10 relative to atmospheric pressure is achieved. The pre-expansion of the air on its way into the combustion chamber during the induction stroke provides sufficient cooling to prevent excessive temperatures being generated during the subsequent compression stroke, and the consistently high degree of expansion within the combustion chamber also keeps down combustion chamber and exhaust temperatures, further diminishing the likelihood of pre-ignition. It will be appreciated from the foregoing that the forced induction system, typically an exhaust driven turbocharger, needs to be able to maintain a substantial degree of boost, typically at least 1.5 atmospheres, over a wide range inlet and exhaust gas flow rates.

The system does result in the development of increased combustion pressures which have been found in tests to result in increased stresses on piston rings of engines so operated, which may result in failure. Accordingly, it is believed that it will usually be necessary to provide a top piston ring of modified construction and/or location so as better to resist these forces. Good results have been obtained with flexible composite ceramic rings.

According to the invention, there is provided a spark ignition internal combustion engine having at least one combustion chamber and an operating cycle with induction, compression, power and exhaust phases, said engine having a forced induction system including an intake air compressor supplying intake air to the engine through an inlet tract comprising at least one throttle, at least one intake port and means to introduce metered quantities of fuel into the inlet tract; wherein the compressor boosts intake air pressure by more than one atmosphere throughout that portion of the operating range of the engine which corresponds to significant opening of the at least one throttle, the at least one throttle and at least one intake port conjointly providing sufficient throttling of the intake air flow over said portion of the operating range such as to provide substantially adiabatic expansion of the air delivered by the compressor through the inlet tract, while causing each combustion chamber to be charged with sufficient air/fuel mixture during the induction phase that the pressure in each combustion chamber at the end of the compression phase is at least ten atmospheres over said portion of the operating range, and the combined temperature and pressure conditions in the combustion chamber during the compression phase remain outside those giving rise to pre-ignition, the means to introduce metered quantities of fuel into the inlet tract being calibrated to provide substantially stoichiometric quantities of fuel relative to the air passing through the tract over said portion of the operating range.

The invention is described further below with reference to the exemplary embodiments.

IN THE DRAWINGS

Figure 1:
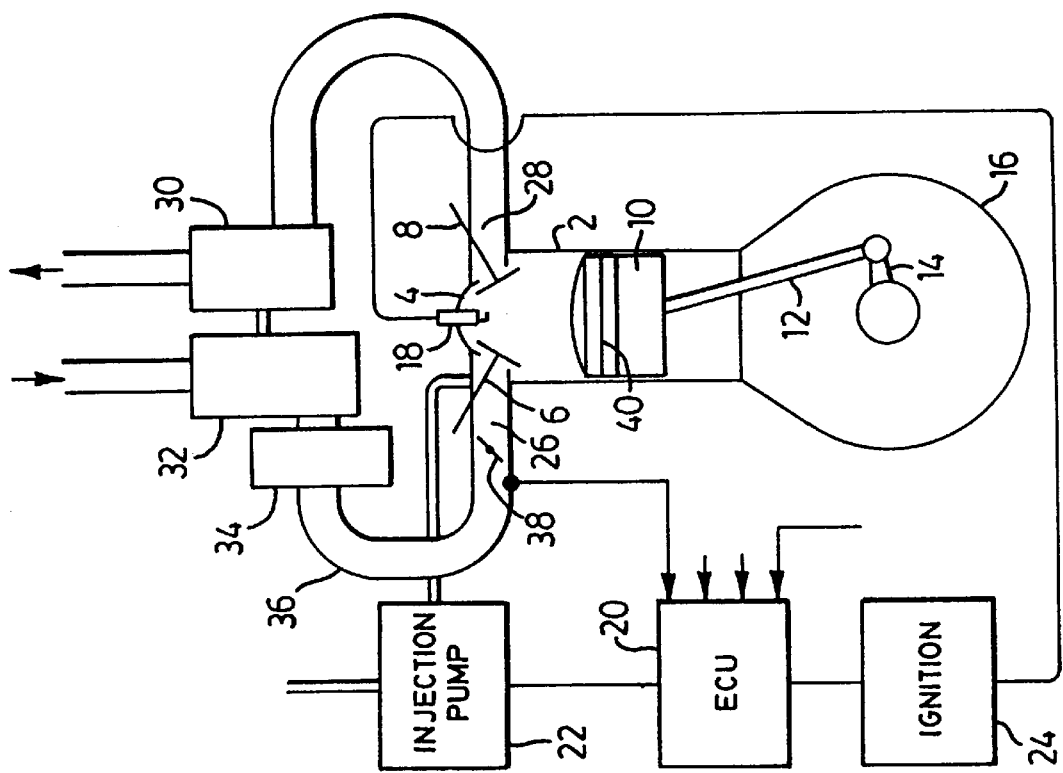

FIG. 1 is a drawing of an internal combustion engine for operation in accordance with the invention; and FIG. 2 is a temperature/pressure graph illustrating conditions in a combustion chamber of an engine in accordance with the invention.

DESCRIPTION OF THE PREFERRED EMBODIMENTS

FIG. 1 shows a diagrammatic illustration of a turbocharged engine to which the invention may be applied. A single cylinder engine is shown for the sake of simplicity, but it should be understood that the invention may, and usually will, be applied to multiple cylinder engines, and that components such as valves may be duplicated in accordance with common practice.

While the invention is described with reference to a four stroke engine having induction, compression, power and exhaust strokes, it should be appreciated that the invention is also applicable to two stroke and rotary engines having induction, compression, power and exhaust phases. A two stroke engine has only compression and power strokes, using forced induction to induce mixture into the cylinder and expel remaining exhaust gases in an induction phase following an exhaust phase during the latter part of the exhaust stroke and first part of the induction stroke. In traditional spark ignition two stroke engine, the forced induction is obtained by using the engine crankcase as a pump, but this arrangement may be supplemented or replaced by an external pump or blower, and such engines may be operated in accordance with the principles of the present invention.

In FIG. 1, the engine has a cylinder 2, with a cylinder head 4 with inlet and outlet valves 6 and 8, a piston 10, a connecting rod 12 and a crankshaft 14 in a crankcase 16, a spark plug 18, and an engine control unit (ECU) 20 controlling a fuel injection pump 22 and an ignition unit 24 connected to the spark plug 18 to control the amount and timing of fuel injected into the inlet port 26 and the timing of sparks applied to the spark plug. The ECU receives inputs from various sensors in conventional manner, although for the purposes of the present invention these should include a sensor detecting the pressure in the inlet tract such as are conventionally provided in turbocharged engines. Gases from the exhaust port 28 are applied to an exhaust turbine 30 before discharge, and the turbine 30 drives an inlet air compressor 32 which compresses intake air applied to the inlet port 26. A conventional intercooler 34 may be provided between the compressor 32 and the port 26, although with operation in accordance with the invention it conditions without it in any particular application.

The above described arrangement is known per se, being characteristic of turbocharged engines but the mode of operation as described further below and determined by characteristics of the ECU 20, turbine 30 and compressor 32 is novel. Although a turbocharger formed by components 30 and 32 is described, and presently preferred, other forced induction arrangements could be used, such as an engine driven blower or a separate air compressor with or without an air reservoir. Whatever forced induction system is used, it is important that it be capable of maintaining substantial compression of air passing through the input tract 36 upstream of a throttle valve 38, by at least one atmosphere, and typically between 1.5 and 2 bars, over that portion of the operating range of the engine in which it develops significant power. This will usually entail provision of a turbocharger or other air compression means which provides substantial compression at much lower engine speeds and throttle opening than is conventional.

Broadly speaking, the blower characteristics are selected so that during the above portion of the operating range of the engine, enough air will be induced into a cylinder of the engine during an induction stroke (four cycle operation is assumed for purposes of description) that the cylinder pressure at the end of the compression stroke prior to ignition by the plug 18 exceeds about ten atmospheres, while at the same time, and particularly under part throttle and relatively low speed operation, the throttle and inlet valves combined with the high degree of thrust will result in substantial adiabatic expansion and hence cooling of the air entering the cylinder, to which a further cooling effect is applied by evaporation of the fuel injected into the port. This cooling limits the temperature rise during the subsequent compression stroke.

During the same portion of the operating range of the engine, the initial combustion pressure during the power stroke will be high because of the size of compressed charge, and the drop in pressure during the power stroke will also be large, producing substantial adiabatic expansion and cooling of the combustion gases, reflected in reduced exhaust gas temperatures, improved thermal efficiency, and lower combustion chamber temperature of the beginning of a subsequent induction stroke, which in turn contributes to restricting the temperature rise occurring during the compression stroke and preventing pre-ignition. It has been found that by these means, it is possible to maintain high effective compression ratios without engendering pre-ignition, and without increasing fuel octane requirements. By maintaining high effective compression ratios whenever the engine is delivering significant power, a considerable increase in thermal efficiency is obtained, contributing both to increased specific power output and reduced generation of waste heat, which in turn reduces exhaust and combustion chamber temperatures.

The ECU is set up to control fuel injection so as to provide a substantially stoichiometric mixture during normal engine operation. This tends to maximize combustion efficiency and minimize unwanted emissions, and contrasts with so-called "lean-burn" technology in which excess air is relied upon to dilute the combustion gases. The reduced combustion chamber temperatures and stoichiometric mixture are both factors tending to inhibit generation of nitrous oxides.

Further aspects of engine operation in accordance with the invention are discussed below with reference to the graph of FIG. 2, which plots the temperature and compression conditions in a typical spark ignition engine, showing those conditions under which it has been found that pre-ignition may occur. It will be seen that at very low or very high combustion chamber temperatures, a high degree of compression is possible without resulting in pre-ignition, but at intermediate temperatures there is a zone D exhibiting drastic reduction in permissible combustion chambers pressure, characterized by unstable ignition characteristics associated with pre-ignition. Acceleration of a conventional engine from small to large throttle openings involves movement through this zone, igniting the initial compression ratio of the engine. Depending on the anti-knock properties of the fuel utilized, the initial compression ratio is usually less than 10 and may need to be substantially less in a turbocharged engine.

In an engine in accordance with the invention, the zone D is bypassed by engaging that as the throttle is opened, the pressure in the combustion chamber is maintained at a high enough level through the critical temperature range that the Zone D is avoided. Typically this will be achieved by ensuring that the combustion chamber pressure of the end of the compression stroke is at least 10 atmospheres when significant power is developed by the engine. This can be achieved by utilizing an initial compression ratio of at least 10, (see line I) and sufficient compression of the induction air, usually at least 1.5 bars, that charging of the cylinder to at least atmospheric pressure can occur during induction by the beginning of the compression stroke. The overpressure required to achieve this results in adiabatic expansion of the induction air during the induction phase providing a substantial cooling effect and reducing or eliminating the need for an intercooler.

Typically the crown of the piston 10 is configured to provide the desired initial compression ratio, and to induce turbulence in the induced charge to avoid stratification and allow it to burn quickly and completely on ignition. Fuel injection is controlled to provide a substantially stoichiometric mixture (lambda=1) but a somewhat richer mixture may be used as is conventional during starting and a very slightly richer mixture may be appropriate under certain other conditions of operation. Large excesses of air, as used in lean-burn systems, should not be used.

The high effective compression ratio and rapid combustion characteristic of the system are found to subject the top compression ring on the piston to severe and uneven stresses, and to high frequency vibration. Accordingly special measures may be needed to avoid any failure, in particular the use of top-compression rings selected to resist failure under such conditions. I have found that the use of composite metallic ceramic rings including 20% of silicon carbide, similar to those used in the engines of Formula 1 racing cars, are able to withstand the high pressures and temperatures encountered in engines operated in accordance with the invention, but other approaches may also be effective such as controlling the depth and width of the clearance between the piston and the cylinder wall above the top ring.

Exemplary applications of the system of the invention are discussed below.

EXAMPLE 1—1988 Porsche 3.2 liter air-cooled engine.

This engine in stock configuration is normally aspirated with two valves per cylinder head and 10.3:1 compression ratio, fan cooled and developing 231 hp @ 5900 rpm and 209 lb/ft @ 4800 rpm. This engine was fuel injected using one injector per cylinder located prior to the intake valve. A Bosch ECU controlled fuel injection and ignition. The induction system consisted of a spider type manifold with one large throttle body centrally located on a common plenum.

The engine was disassembled and the pistons fitted with a composite metallic ceramic top compression ring. Only the top compression ring was replaced on the otherwise stock pistons, and the other rings remained stock. The combustion chamber dome was modified to offer turbulent flow conditions in the chamber. This was done by making large indentations into the flat surfaces of the combustion chamber in the cylinder head.

The engine was reassembled to a long block condition and modifications were made to the intake and exhaust systems as follows.

The crank driven cooling fan and engine shroud that are normally used to deliver cooling air over the cylinders were removed. A support housing was made to hold the alternator that is normally located behind the cooling fan. The stock intake manifold was modified to accept an additional throttle body beside the original one. For space reasons, the original throttle body was relocated more to the right side of the plenum to allow room for the second throttle body.

The exhaust system was changed to allow two exhaust gas driven turbochargers to be used. Intercoolers were fitted to the top of the engine to allow cooling of the compressed air prior to introduction to the cylinder.

The stock ECU (engine control unit) was replaced by one from a turbocharged engine to enable the ECU to accept input from a pressure transducer providing input to ECU about engine boost conditions, conditioning the engine maps to supply different fuel and timing characteristics according to boost pressure. The ECU program was modified to include fuel and ignition timing maps consistent with the mode of operation discussed above.

On test, this engine delivered 852 hp @ 7800 rpm @ 1.6 bar boost and 484 lb/ft @ 5400 rpm.

EXAMPLE 2—Audi 5000 turbocharged engine, 5 cylinder, 2.1 liter.

In stock form the engine used had a 7.1:1 compression ratio, and developed 160 hp @ 5500 rpm and 170 lb/ft @ 3000 rpm. The modifications made were generally similar to those discussed above, with the turbocharger changed so that the boost threshold was just above idle and it developed a boost pressure of at least 1.5 bar. The compression ratio was raised to 10.2:1, and when operated in accordance with the invention the engine developed 455 hp @ 5100 rpm and 276 lb/ft torque @ 4100 rpm.

EXAMPLE 3—Porsche 3.2 liter racing engine.

This engine was originally fitted with twin turbochargers and had a 7.0:1 compression ratio and mechanical fuel injection. It delivered 750 hp @ 8200 rpm at 1.4 bar boost. Torque figures were not published, but is believed that the engine developed about 500 lb/ft. Fuel consumption under racing conditions was in excess of 120 liters per hour.

This engine was modified similarly to those of the previous examples, with the addition of individual throttle bodies and twin injectors for each cylinder, the compression ratio again being raised to 10.2:1. The modified engine developed 1120 hp at 7800 rpm at 1.6 bars boost, and 746 lb/ft torque at 4000–6500 rpm. Fuel consumption under racing conditions was about 75 liters per hour.

In each case, exhaust temperatures in the modified engines were notably lower, reflecting increased efficiency.

What is claimed is:

1. A spark ignition internal combustion engine having at least one combustion chamber and an operating cycle with induction, compression, power and exhaust phases, said engine having a forced induction system including an intake air compressor supplying intake air to the engine through an inlet tract comprising at least one throttle, at least one intake port and means to introduce metered quantities of fuel into the inlet tract; wherein the compressor is designed to boost intake air pressure by more than one atmosphere throughout that portion of the operating range of the engine which corresponds to significant opening of the at least one throttle, the at least one throttle and at least one intake port conjointly providing sufficient throttling of the intake air flow over said portion of the operating range such as to provide substantially adiabatic expansion of the air delivered by the compressor through the inlet tract, while causing each combustion chamber to be charged with sufficient air/fuel mixture during the induction phase that the pressure in each combustion chamber at the end of the compression phase is at least ten atmospheres over said portion of the operating range and the combined temperature and pressure conditions in the combustion chamber during the compression phase remain outside those giving rise to pre-ignition, the means to introduce metered quantities of fuel into the inlet tract being calibrated to provide substantially stoichiometric quantities of fuel relative to the air passing through the tract over said portion of the operating range.

2. An engine according to claim 1, wherein the engine is a reciprocating piston engine having a piston associated with each combustion chamber.

3. An engine according to claim 2, wherein the engine is a four stroke engine having induction, compression, power and exhaust strokes corresponding to the induction, compression, power and exhaust phases.

4. An engine according to claim 2, wherein each piston has piston rings including a top compression ring, and the top compression ring is selected for increased resistance to high and uneven combustion pressures.

5. An engine according to claim 4, wherein each top compression ring is a composite metal ceramic ring with a substantial content of silicon carbide.

* * * * *